United States Patent
Duch

(10) Patent No.: US 9,261,144 B2
(45) Date of Patent: Feb. 16, 2016

(54) SEALING AND SIGNALING DEVICE, IN PARTICULAR FOR A ROLLING BEARING

(71) Applicant: Daniele Duch, Airasca (IT)

(72) Inventor: Daniele Duch, Airasca (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/477,233

(22) Filed: Sep. 4, 2014

(65) Prior Publication Data

US 2015/0063734 A1     Mar. 5, 2015

(30) Foreign Application Priority Data

Sep. 4, 2013    (IT) ................ TO2013A0715

(51) Int. Cl.
| | |
|---|---|
| F16C 32/00 | (2006.01) |
| F16C 41/00 | (2006.01) |
| F16C 33/78 | (2006.01) |
| F16C 33/80 | (2006.01) |

(52) U.S. Cl.
CPC ........... *F16C 41/007* (2013.01); *F16C 33/7823* (2013.01); *F16C 33/7879* (2013.01); *F16C 33/805* (2013.01)

(58) Field of Classification Search
CPC ............. F16C 19/184–19/187; F16C 19/383; F16C 19/385; F16C 19/386; F16C 33/7823; F16C 33/7879; F16C 33/805; F16C 41/007; F16C 2326/02

USPC .......... 384/448, 477, 480, 484, 486, 544, 589
See application file for complete search history.

(56) References Cited

U.S. PATENT DOCUMENTS 6,323,640 B1 * 11/2001 Forestiero et al. ............ 384/448
6,692,153 B2 * 2/2004 Ohtsuki et al. ................ 384/448

FOREIGN PATENT DOCUMENTS

| EP | 0607719 A1 | 7/1994 |
|---|---|---|
| EP | 0930505 A1 | 7/1999 |
| JP | 2004169925 A | 6/2004 |
| JP | 2011099464 A | 5/2011 |
| WO | 2012176849 A1 | 12/2012 |

* cited by examiner

*Primary Examiner* — James Pilkington
(74) *Attorney, Agent, or Firm* — Bryan Peckjian; SKF USA Inc. Patent Dept.

(57) ABSTRACT

A device including a sealing assembly having a first annular shield constrainable to a rotating first member, a second annular shield facing the first shield and constrainable to a stationary second member, and an annular seal supported by the first shield and provided with annular lips cooperating with the second shield. The device has a signal generator device having a third shield constrainable to the first member and an annular signal generator element arranged facing the first and the second shields; wherein the first shield has a flange portion, having on a side of the first shield, a first and a second L-fold in opposite directions which delimit a first annular surface facing the annular lips and the second shield; wherein the annular signal generator element is delimited towards the second shield by a second annular surface facing the annular lips forming an obtuse angle with the first annular surface.

8 Claims, 2 Drawing Sheets

SEALING AND SIGNALING DEVICE, IN PARTICULAR FOR A ROLLING BEARING

CROSS-REFERENCE TO RELATED APPLICATIONS

This application claims priority to Italian Patent Application No. TO2013A000715 filed Sep. 4, 2013, which is herein fully incorporated by reference.

FIELD OF THE INVENTION

The present invention relates to a sealing and signaling device, in particular for a rolling bearing intended to equip a wheel hub assembly of a vehicle. The invention further relates to a rolling bearing unit equipped with such a sealing and signaling device.

BACKGROUND OF THE INVENTION

As known, for example from U.S. Pat. No. 6,323,640, rolling bearings of wheel hub assemblies of vehicles are usually equipped with a sealing assembly of the "packet" type, comprising two shields arranged side-by-side and constrained in use to a first, outer ring (usually constituting the rotating ring of the bearing in use, in this application) and a second, inner ring of the bearing (usually constituting the stationary ring of the bearing in use); the first shield integrally carries an annular seal provided with annular lips cooperating in a fluid-tight manner with the second shield in use. The bearings of this type are then also equipped with a signal generator device (also named "phonic wheel" or "encoder" in jargon) constrained to the ring rotating in use of the bearing and constituted by a further shield defined by a metallic support and by a ring made of a magnetizable plastic-based material or an elastomeric blend, magnetized so as to have an alternation of magnetized and non-magnetized zones, or having opposite polarities.

In use, the rotation of the "phonic wheel", which as mentioned is integral with the outer ring of the bearing, allows when coupled to an appropriate sensor, to detect the rotation of the wheel of the vehicle.

However, the need to make the ring defining the phonic wheel or encoder relatively large in size to obtain a signal which can be well detected and regular at the required diameters has the drawback of creating an obstacle to the exiting of water or other contaminants which may in use overcome the second shield and come into direct contact with the outermost sealing lip of the of the annular seal.

SUMMARY OF THE INVENTION

It is the object of the present invention to provide a sealing and signaling device, in particular for a rolling bearing, and a rolling bearing for wheel hub assemblies of vehicles, comprising a sealing assembly of the "packet" type and a signal generator device, which allows, on one hand, to ensure the generation of a magnetic signal which is always suitable and, on the other hand, in addition to preventing as much as possible the access of external contaminants towards the seal also ensures a rapid, continuous emptying of the possible "pocket" which is defined between the encoder and the first shield.

According to the invention a sealing and signaling device, in particular for a rolling bearing, and a rolling bearing unit for wheel hub assemblies of vehicles, having the features disclosed in the appended claims are thus provided.

BRIEF DESCRIPTION OF THE DRAWINGS

The invention will now be described with reference to the accompanying drawings which illustrate two non-limitative embodiments thereof, in which.

DETAILED DESCRIPTION OF THE INVENTION

Figure 1:
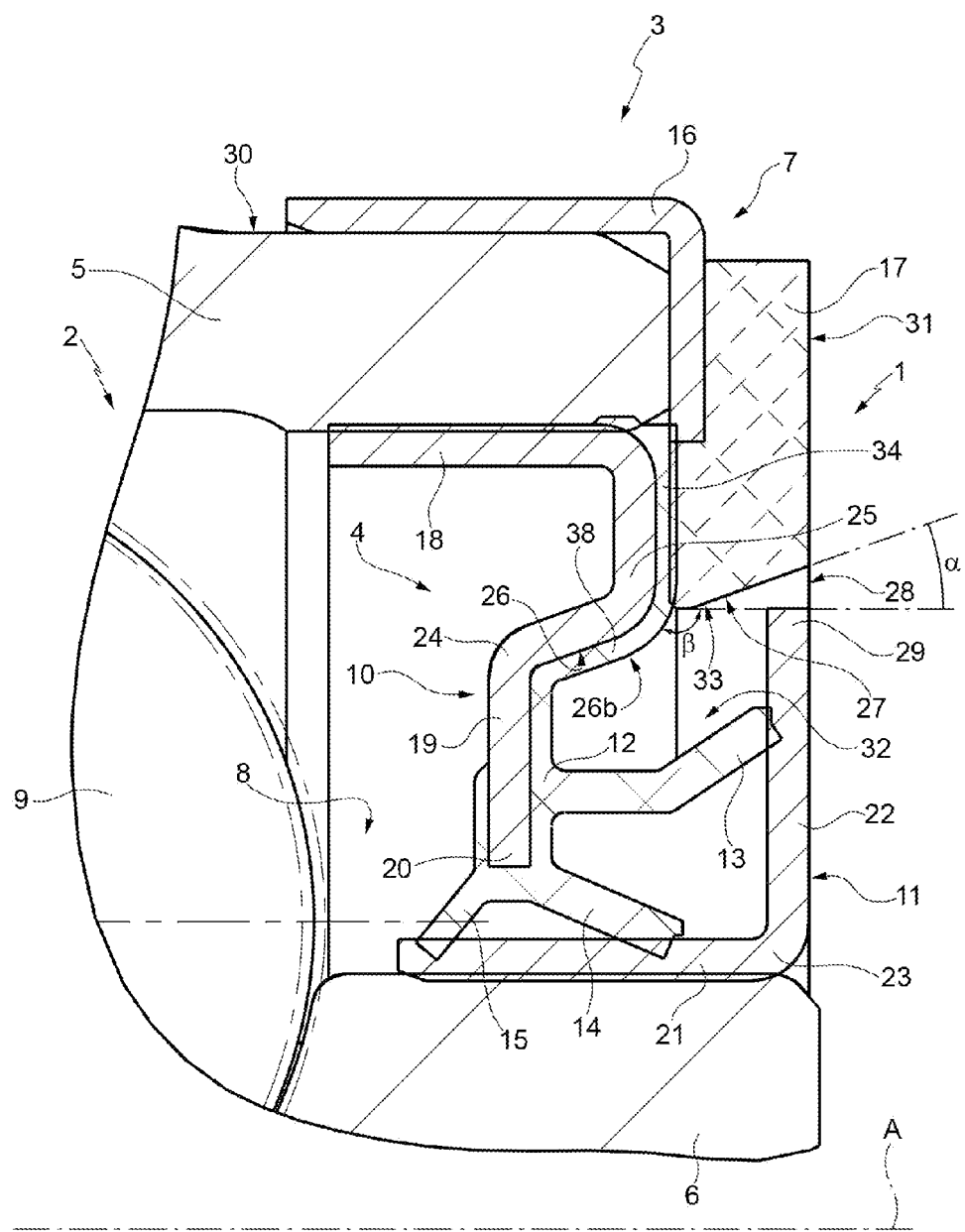
FIG. 1 diagrammatically shows a radial section view of a rolling bearing unit, in particular adapted to equip wheel hub assemblies of vehicles, equipped with a sealing and signaling device according to the invention, the rolling bearing unit being illustrated only in part for the sake of simplicity.

With reference to FIG. 1, reference numeral 1 indicates as a whole a sealing and signaling device for a rolling bearing 2 and which forms with the rolling bearing 2 a rolling bearing unit 3, in particular adapted to equip wheel hub assemblies of vehicles (known and not shown for the sake of simplicity).

The device 1 comprises a sealing assembly 4 adapted to be interposed between a first member 5, rotating in use, and a second member 6, stationary in use, and a signal generator device 7, adapted to be angularly and integrally constrained to the first member 5.

In the illustrated example, the sealing assembly 4 is inserted between an outer ring 5, rotating in use, of the rolling bearing 2, defining the first member, and an inner ring 6, stationary in use, of the rolling bearing 2, defining the second member, for sealing in a fluid-tight manner an annular chamber 8 delimited between the outer ring 5 and the inner ring 6 and in which rolling bodies 9 of the bearing 2 are housed.

The sealing assembly 4 comprises a first annular shield 10 constrainable in use to the first member, and in the illustrated example integrally constrained to the outer ring 5, a second annular shield 11, arranged in use facing the shield 10 and constrainable to the second member, in the illustrated example integrally constrained to the inner ring 6, and an annular seal 12 integrally carried by the shield 10 and provided with a plurality of annular lips 13,14,15, which fluid-tightly cooperate (in known manner) with the shield 11, preferably by sliding contact.

Instead, the signal generator device 7 comprises a third shield 16, constrainable in use to the member/ring 5 separately from the shield 10 and an annular signal generator element 17 integrally carried by the shield 16 on side opposite to the shield 10 and positioned at least in part facing the shield 10 and the shield 11; the signal generator element 17 consists of a ring made of a magnetizable plastic-based material or an elastomeric blend, magnetized so as to have an alternation of magnetized and non-magnetized zones, or having opposite polarities, which is chemically and physically integral to the shield 16.

The element or ring 17 radially extends so as to protrude from the shield 16 and towards the shield 11, so as to partially face the shield 10.

The shield 10 has a fitting portion 18, with axial extension, and a flange portion 19, which radially extends so as to protrude from the fitting portion 18 radially inwards and towards the ring 6 and which ends with a radially inner free end 20, overhangingly carrying the annular lips 13,14,15 so as to protrude.

The shield 11 also has a fitting portion 21 with an axial extension for fixing in use to the second member or inner ring 6 and a flange portion 22 which radially extends so as to protrude from the fitting portion 21 outwards, on the side of the ring 5; in particular, the flange portion 22 is arranged on side opposite to the shield 10, because it extends so as to protrude from an end 23 of the fitting portion 21 facing the side opposite to the shield 10, and is arranged in position facing the flange portion 19 of the shield 10.

According to one of the main aspects of the invention, the flange portion 19 has on the side of the fitting portion 18 a first L-fold 24 and a second L-fold 25, made in opposite directions, in the case in point the fold 24 towards the shield 11 and the fold 25 towards the fitting portion 18, which delimit on the flange portion 19, towards the annular lips 13,14,15, a first annular surface 26 facing the annular lips 13,14,15 and the shield 11; in combination, the annular signal generator element or ring 17 is delimited towards the shield 11 by a second annular surface 27 constituting a radially inner lateral surface thereof facing the annular lips 13,14,15 and the shield 11.

Figure 2:
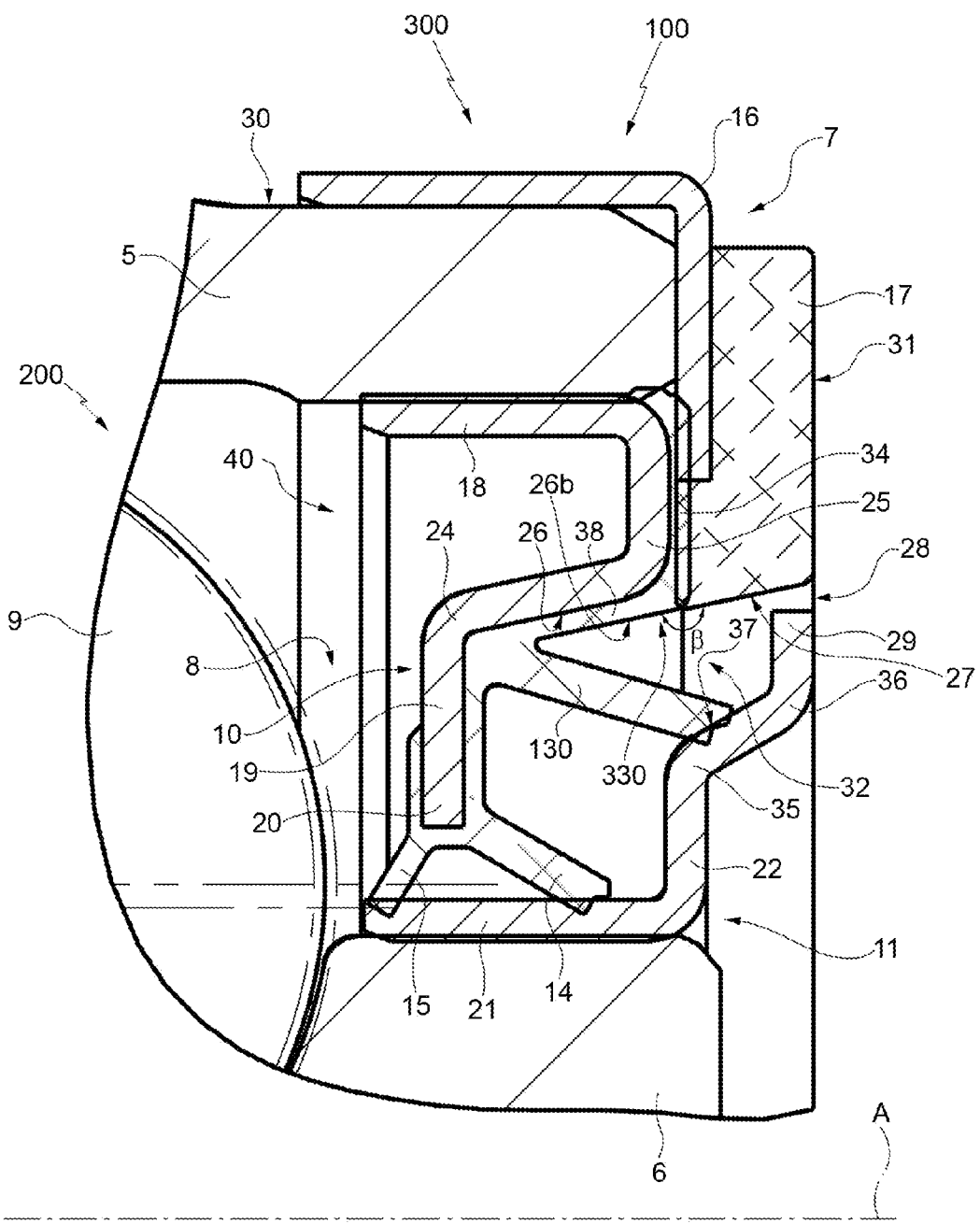
FIG. 2 diagrammatically shows a radial section view of a rolling bearing unit like the one shown in FIG. 1, equipped with a variant of the sealing and signaling device according to the invention, the rolling bearing unit being illustrated only in part for the sake of simplicity.

According to an aspect of the invention, the surfaces 26 and 27 are arranged immediately adjacent to one another, so as to avoid infiltrations and deposits of contaminant between the element 17 and the seal 12; the seal 12 coats the flange portion 19 forming an elastically deformable layer 34 interposed between the shield 10 and the protruding portion of the signal generator element 17, against which layer 34 the protruding portion of the signal generator element 17 couples in abutment with a slight axial interference, as diagrammatically shown in FIGS. 1 and 2.

The seal 12 also forms, at the annular surface 26, a thin layer 38 of elastomeric material belonging to the seal 12 and which defines a surface 26b parallel to the surface 26 and also delimited between the folds 24 and 25 over the surface 26 of the flange portion 19 delimited between the folds 24 and 25, and on the outside of the flange portion 19 with respect to the chamber 8.

According to an aspect of the invention, the surfaces 26,26b on one hand, and surface 27 on the other, form an obtuse angle β therebetween; according to a preferred embodiment of the invention, the annular surfaces 26,26b and 27 form an angle β having a width not smaller than the width of a flat angle.

In the non-limitative illustrated case in point, the surfaces 26,26b and 27 are defined by stretches of conical surfaces having taper facing the first shield 10 with respect to the second shield 11, so as such surfaces progressively move away from the shield 11, in particular from its fitting portion 21, in the direction of the flange portion 22.

Hereinafter, as "taper" of a conical surface is meant the angle that the conical surface forms with the symmetry axis thereof in radial section (in FIG. 1 only the angle α related to the surface 27 is shown for the sake of simplicity). In particular, the surfaces 26 and 27 have the same taper but, in the non-limiting example shown, are not coplanar, because the surface 27 is slightly offset radially outwards in radial direction with respect to the surface 26. The symmetry axis of the conical surfaces 26 and 27 coincides with a symmetry axis A of the sealing assembly 4 with respect to which the shields 10,11 and 16 are all coaxial.

With reference now also to FIG. 2, in which details either similar or equal to those already described are indicated for the sake of simplicity with the same reference numeral, reference numeral 100 is a variant of the device 1 described above applied to a rolling bearing 200 for forming a rolling bearing unit 300. The bearing 200 differs from the bearing 2 only in that the inner ring 6 has a reduced axial extension; while the inner ring 6 axially extends so as to protrude from the outer ring 5 in the bearing 2, the rings 5 and 6 substantially have the same axial extension in the bearing 200.

The variant 100 of the device of the invention differs from the device 1 only for some details of the sealing assembly, which is indicated by reference numeral 40.

Firstly, the surfaces 26b and 27, which are again defined by conical surface stretches having the same taper, are coplanar to each other and are arranged flush with each other, thus defining two adjacent stretches of a same conical surface.

Secondly, in the variant 100, the flange portion 22 of the shield 11 has, on the side opposite to the fitting portion 21, a first L-fold 35 and a second L-fold 36 in opposite directions, which delimit an annular surface 37 on the flange portion 22 towards the shield 10, which is oblique with respect to the symmetry axis A of the sealing assembly 40, arranged facing the annular surface 27 and oriented towards the surface 26b.

In both embodiments, the second shield 11 is arranged near the second annular surface 27 to define a labyrinth seal 28 therewith. In the case in point, the ring or annular signal generator element 17 radially extends so as to protrude from the shield 16 so as to flank the flange portion 19 of the shield 10, in particular along an entire stretch thereof comprised between the fold 25 and the fitting portion 18. Vice versa, the flange portion 22 of the shield 11 ends with a radially outer peripheral rim 29, opposite to the fitting portion 21 and which is arranged close to the surface 27, but set apart therefrom with a predetermined annular clearance which indeed forms the labyrinth seal 28.

According to the invention, the flange portion 22 is always made so that the peripheral rim 29 (in the variant 100, the surface 37 is arranged close to the edge 29) is arranged axially on the opposite side of the flange portion 19, axially close to, and preferably flush with, a front surface 31 of the signal generator element or ring 17 facing outwards of the chamber 8. In any case, the flange portion 22 is shaped so that the peripheral rim 29 is arranged axially closer to the front surface 31 of the signal generator element or ring 17 than to the flange portion 19 of the shield 10.

Therefore, in the two illustrated embodiments, the flange portion 22 is made so that the outer peripheral edge 29 of the flange portion 22 of the second shield 11 is arranged flush with the front surface 31 of the signal generator element 17, in axial direction. Furthermore, the annular surface 27 laterally delimiting the ring 17, radially on the inside, is again arranged outside the annular chamber 8.

Furthermore, as mentioned, in both embodiments 1 and 100, the shield 10 is made integral in use with the outer ring 5 by forcing the insertion of its fitting portion 18 inside the ring 5, while the shield 11 is made integral with the inner ring 6 by forcing the insertion of its fitting portion 21 externally over the ring 5, so as to be arranged with the flange portion 22 thereof outside the annular chamber 8, and the shield 16 is integrally constrained to the outer ring 5, on a radially outer lateral surface 30 of the outer ring 5.

The annular lip 13 (FIG. 1) which is arranged radially more outwards and thus closer to the fitting portion 18, extends so as to protrude from the flange portion 19 in direction at least in part axial and on the part of the annular surface 26 to cooperate with the flange portion 22 close to the peripheral rim 29, while the lips 15 and 14 (and any other lips possibly present) extend so as to protrude from the flange portion 19 to cooperate in radial direction with the fitting portion 21 of the shield 11.

In particular, the lip 13 is interposed between the labyrinth seal 28 and the fitting portion 21 of the second shield 11 so as to form with the shields 10,11 and with the annular signal generator element 17 an annular water pocket 32 radially delimited, on the side opposite to the shield 11, by a wall 33 defined substantially without interruption (besides the "step" formed by the slight radial offset) of the annular surfaces 26*b* and 27 and rotating in use, therefore adapted to dynamically guide possible contaminants which may have penetrated in the pocket 32 beyond the labyrinth seal 28 and towards the outside of the chamber 8.

In the variant of FIG. 2, the lip 13 is replaced by a lip 130 having a different shape and which cooperates in fluid-tight manner with the oblique annular surface 37; in particular, while the lip 13 is shaped as a very open V-shape, being formed by two rectilinear stretches angled with one another and forming an obtuse angle, the lip 130 is a rectilinear lip, which extends obliquely with respect to the symmetry axis A. Consequently, the pocket 32 is smaller in the device 100 than in the device 1, and is delimited by a substantially continuous oblique wall 330. In any case, the "step" present in device 1, by developing radially outwards and toward the fitting portion 18 does not alter the capability of the wall 33 to dynamically transport possible contaminants out from the pocket 32.

Furthermore, in the variant 100, the first and second fold 35,36 and the annular surface axially project so as to protrude from the inner ring 6 of the bearing 200, thus allowing to obtain excellent hydraulic performance even if the ring 6 is small in size.

The invention claimed is:

1. A sealing and signaling device for a rolling bearing, comprising:
    a sealing assembly adapted to be interposed between a first rotating member and a second stationary member and a signal generator device adapted to be disposed on the first member; wherein the sealing assembly provides a first annular shield located on the first member, a second annular shield arranged facing the first shield and located on the second member, an annular seal integrally supported by the first shield and provided with a plurality of annular lips configured to contact the second shield to each form a lip seal therewith; and wherein
    the signal generator device comprises a third shield and an annular signal generator element, the third shield being disposed on the first member separately from the first shield, the annular signal generator element disposed on the third shield on a side opposite to the first shield, the annular signal generating element extending radially inwardly from the third shield such that a portion of the annular signal generating element faces the first and the second shields; the first shield having a fitting portion, with axial extension, and a first flange portion, which radially extends to protrude from the fitting portion and ends with a free end over which the annular seal is located; wherein in combination:
    i) on the side of the fitting portion, the first flange portion has a first and a second L-fold in opposite directions which delimit, on the first flange portion and towards the annular lips, a first annular surface facing the annular lips and the second shield;
    ii) the annular signal generator element delimited towards the second shield by a second annular surface facing the annular lips and the second shield, the annular signal generator having a front surface which extends radially and faces axially away from the third shield;
    iii) the first and the second annular surfaces are arranged immediately adjacent to each other and form an angle (β) therebetween which is greater than ninety degrees and less than or equal to one hundred eighty degrees, when viewed in an axial cross section;
    iv) the second shield has a second flange portion that radially extends to protrude from a second fitting portion having axial extension of the second shield to be fixed to the second member, the second flange portion including first and second flange axial sides, the second flange portion including a distal end opposite from the second fitting portion, the second axial flange side facing away from the first shield, a portion of the second flange axial side adjacent to the distal end being radially coplanar and flush with the front surface; the second flange portion being arranged on a side opposite to the first shield and in a position facing the first flange portion and ending with a peripheral rim, opposite to the fitting portion of the second shield and arranged in a facing orientation with the second annular surface for defining a labyrinth seal therewith; and wherein
    v) the second flange portion is shaped such that its peripheral rim is arranged axially on the side opposite to the first flange portion, axially closer to the frontal surface of the signal generator element facing to the outside than to the first flange portion of the first shield, in proximity with and flush with the front surface of the signal generator element.

2. The sealing and signaling device according to claim 1, wherein the angle between the first and the second annular surfaces is one hundred eighty digress such that the first and second annular surfaces are coplanar to each other and flush with each other, when viewed in the axial cross section.

3. The sealing and signaling device according to claim 1, wherein a first lip of the plurality of annular lips extends to protrude from the first flange portion on the side of the first annular surface for cooperating with the second flange portion at a location spaced from the second fitting portion of the second shield, and wherein
    a second lip of the plurality of annular lips and a third lip of the plurality of annular lips extend to protrude from the first flange portion for cooperating in a radial direction with the second fitting portion of the second shield; the first lip being interposed between the labyrinth seal and the second fitting portion of the second shield to form, with the first and the second shields and with the annular signal generator element, an annular water pocket radially delimited, on a side opposite to the second shield, by a wall defined, substantially without interruption, by the first and second annular surfaces and rotating in operation, adapted to dynamically guide possible contaminants penetrated into the pocket beyond the labyrinth.

4. The sealing and signaling device according to claim 1, wherein the second flange portion has, on the side opposite to the fitting portion, a third L-fold and a fourth L-fold in opposite directions which delimit, on the second flange portion, an annular surface which is oblique with respect to a central axial axis of the sealing assembly and arranged facing the second annular surface; a first lip of the plurality of annular lips cooperating with the annular surface of the second shield to form a seal, the first lip extending obliquely with respect to the central axial axis.

5. A sealing and signaling device for a rolling bearing, comprising:
    a sealing assembly adapted to be interposed between a first rotating member and a second stationary member and a signal generator device adapted to be disposed on the first member; wherein the sealing assembly provides a first annular shield located on the first member, a second annular shield arranged facing the first shield and located on the second member, an annular seal integrally supported by the first shield and provided with a plurality of annular lips configured to contact the second shield to each form a lip seal therewith; and wherein the signal generator device comprises a third shield and an annular signal generator element, the third shield being disposed on the first member separately from the first shield, the annular signal generator element disposed on the third shield on a side opposite to the first shield, the annular signal generating element extending radially inwardly from the third shield such that a portion of the annular signal generating element faces the first and the second shields; the first shield having a fitting portion, with axial extension, and a first flange portion, which radially extends to protrude from the fitting portion and ends with a free end over which the annular seal is located; wherein in combination:

i) on the side of the fitting portion, the first flange portion has a first and a second L-fold in opposite directions which delimit, on the first flange portion and towards the annular lips, a first annular surface facing the annular lips and the second shield;

ii) the annular signal generator element delimited towards the second shield by a second annular surface facing the annular lips and the second shield;

iii) the first and the second annular surfaces are arranged immediately adjacent to each other and form an angle ($\beta$) therebetween which is greater than ninety degrees and less than or equal to one hundred eighty degrees, when viewed in an axial cross section, wherein the first and the second annular surfaces are both conical surfaces having their taper facing toward the first shield, wherein the first and second annular surfaces progressively move radially away from the second fitting portion of the second shield as the first and second annular surfaces extend axially toward the second flange portion of the second shield;

iv) the second shield has a second flange portion that radially extends to protrude from a second fitting portion having axial extension of the second shield to be fixed to the second member; the second flange portion of the second shield being arranged on a side opposite to the first shield and in a position facing the first flange portion and ending with a peripheral rim, opposite to the fitting portion of the second shield and arranged in a facing orientation with the second annular surface for defining a labyrinth seal therewith; and wherein v) the second flange portion is shaped such that its peripheral rim is arranged axially on the side opposite to the first flange portion, axially closer to a frontal surface of the signal generator element facing to the outside than to the flange portion of the first shield, in proximity with and flush with the front surface of the signal generator element.

6. The sealing and signaling device according to claim 5, wherein the first and the second annular surfaces have the same taper.

7. A sealing and signaling device for a rolling bearing, comprising:

a sealing assembly adapted to be interposed between a first rotating member and a second stationary member and a signal generator device adapted to be disposed on the first member; wherein the sealing assembly provides a first annular shield located on the first member, a second annular shield arranged facing the first shield and located on the second member, an annular seal integrally supported by the first shield and provided with a plurality of annular lips configured to contact the second shield to each form a lip seal therewith; and wherein the signal generator device comprises a third shield and an annular signal generator element, the third shield being disposed on the first member separately from the first shield, the annular signal generator element disposed on the third shield on a side opposite to the first shield, the annular signal generating element extending radially inwardly from the third shield such that a portion of the annular signal generating element faces the first and the second shields; the first shield having a fitting portion, with axial extension, and a first flange portion, which radially extends to protrude from the fitting portion and ends with a free end over which the annular seal is located; wherein in combination:

i) on the side of the fitting portion, the first flange portion has a first and a second L-fold in opposite directions which delimit, on the first flange portion and towards the annular lips, a first annular surface facing the annular lips and the second shield;

ii) the annular signal generator element delimited towards the second shield by a second annular surface facing the annular lips and the second shield, wherein the annular signal generator element is defined by a ring made of a magnetizable plastic-based material or an elastomeric blend, magnetized to have an alternation of magnetized and non-magnetized zones, or having opposite polarities, which is physically integral with the third shield, wherein the ring extends radially inwardly from the third shield and towards the second shield such that a portion of the ring is axially aligned with the first flange portion of the first shield;

iii) the first and the second annular surfaces are arranged immediately adjacent to each other and form an angle ($\beta$) therebetween which is greater than ninety degrees and less than or equal to one hundred eighty degrees, when viewed in an axial cross section;

iv) the second shield has a second flange portion that radially extends to protrude from a second fitting portion having axial extension of the second shield to be fixed to the second member; the flange portion of the second shield being arranged on a side opposite to the first shield and in a position facing the first flange portion and ending with a peripheral rim, opposite to the fitting portion of the second shield and arranged in a facing orientation with the second annular surface for defining a labyrinth seal therewith; and wherein v) the second flange portion is shaped such that its peripheral rim is arranged axially on the side opposite to the first flange portion, axially closer to a frontal surface of the signal generator element facing to the outside than to the flange portion of the first shield, in proximity with and flush with the front surface of the signal generator element.

8. The sealing and signaling device according to claim 7, wherein the first flange portion is coated, on the side of the second shield, by the annular seal which forms an elastically deformable layer interposed between the first shield and the protruding portion of the signal generator element against which layer the protruding portion of the signal generator element couples in abutment with a slight axial interference.

* * * * *